United States Patent
Guen (10) Patent No.: US 9,755,196 B2
(45) Date of Patent: Sep. 5, 2017

(54) RECHARGEABLE BATTERY INCLUDING CURRENT COLLECTING MEMBER WITH CURRENT COLLECTING PART HAVING TWISTED SURFACE

(71) Applicant: SAMSUNG SDI CO., LTD., Yongin-si, Gyeonggi-do (KR)

(72) Inventor: Min-Hyung Guen, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 302 days.

(21) Appl. No.: 14/560,471

(22) Filed: Dec. 4, 2014

(65) Prior Publication Data

US 2015/0287999 A1    Oct. 8, 2015

(30) Foreign Application Priority Data

Apr. 7, 2014    (KR) .................. 10-2014-0041287

(51) Int. Cl.
| | |
|---|---|
| *H01M 2/02* | (2006.01) |
| *H01M 2/04* | (2006.01) |
| *H01M 2/26* | (2006.01) |
| *H01M 2/06* | (2006.01) |
| *H01M 2/30* | (2006.01) |

(52) U.S. Cl.
CPC .......... *H01M 2/043* (2013.01); *H01M 2/024* (2013.01); *H01M 2/0217* (2013.01); *H01M 2/0404* (2013.01); *H01M 2/26* (2013.01); *H01M 2/263* (2013.01); *H01M 2/06* (2013.01); *H01M 2/30* (2013.01); *H01M 2/305* (2013.01); *H01M 2220/20* (2013.01); *H01M 2220/30* (2013.01)

(58) Field of Classification Search
CPC .... H01M 2/024; H01M 2/0404; H01M 2/043; H01M 2/263; H01M 2/0217; H01M 2/26; H01M 2/06; H01M 2/30; H01M 2220/20; H01M 2220/30; H01M 2/305
USPC .......................................... 429/179
See application file for complete search history.

(56) References Cited

U.S. PATENT DOCUMENTS

2012/0258342 A1* 10/2012 Tstsumi ................. H01G 11/66
                                                              429/94

FOREIGN PATENT DOCUMENTS

| JP | 2006-236790 | 9/2006 |
|---|---|---|
| KR | 10-2013-0098135 | 4/2013 |

* cited by examiner

*Primary Examiner* — Gary Harris
(74) *Attorney, Agent, or Firm* — Lee & Morse, P.C.

(57) ABSTRACT

A rechargeable battery includes an electrode assembly that performs charging and discharging operations, a case having the electrode assembly enclosed therein, a cap plate coupled with an opening of the case, an electrode terminal on the cap plate, and a current collecting member connecting the electrode assembly to the electrode terminal. The current collecting member includes a terminal connecting part connected to the electrode terminal, and an electrode connecting part connected to an uncoated region of the electrode assembly, the electrode connecting part including a twisted surface, the twisted surface facing a sidewall of the case at a predetermined inclination angle with respect to a direction from the sidewall toward an end of the uncoated region.

9 Claims, 6 Drawing Sheets

RECHARGEABLE BATTERY INCLUDING CURRENT COLLECTING MEMBER WITH CURRENT COLLECTING PART HAVING TWISTED SURFACE

CROSS-REFERENCE TO RELATED APPLICATION

Korean Patent Application No. 10-2014-0041287, filed on Apr. 7, 2014, in the Korean Intellectual Property Office, and entitled: "Rechargeable Battery," is incorporated by reference herein in its entirety.

BACKGROUND

1. Field

Embodiments relate to a rechargeable battery including a current collecting member for electrically connecting an electrode assembly and an electrode terminal.

2. Description of the Related Art

A rechargeable battery is a battery that can be repeatedly charged and discharged, unlike a primary battery. A low-capacity rechargeable battery is used for small portable electronic devices such as a mobile phone, a laptop computer, and a camcorder and a large-capacity rechargeable battery is used as a power supply for driving a motor of a hybrid vehicle and an electric vehicle.

For example, the rechargeable battery includes an electrode assembly performing charging and discharging operations, a case having the electrode assembly and an electrolyte solution embedded therein, a cap plate coupled with an opening of the case, electrode terminals installed on the cap plate, and a current collecting member electrically connecting the electrode assembly and the electrode terminal.

SUMMARY

Embodiments are directed to a rechargeable battery including an electrode assembly that performs charging and discharging operations, a case having the electrode assembly enclosed therein, a cap plate coupled with an opening of the case, an electrode terminal on the cap plate, and a current collecting member connecting the electrode assembly to the electrode terminal. The current collecting member includes a terminal connecting part connected to the electrode terminal, and an electrode connecting part connected to an uncoated region of the electrode assembly. The electrode connecting part includes a twisted surface. The twisted surface faces a sidewall of the case at a predetermined inclination angle with respect to a direction from the sidewall toward an end of the uncoated region.

The case may includes a bottom facing the opening, the bottom having a quadrangular shape and rounded corners, a pair of wide walls between the bottom and the opening, the pair of wide walls facing each other, and a pair of narrow walls facing each other and connecting the pair of wide wall. The end of the uncoated region may face towards a narrow wall of the pair of narrow walls.

The electrode connecting part may include an integrating part that is bent toward the bottom of the case from the terminal connecting part to face the narrow wall, and a welding part that is welded to the uncoated region. The welding part may extend from the integrating part toward the bottom of the case and bending toward a wide wall of the pair of side walls to face the wide wall. The welding part may be partially twisted to form the twisted surface.

The twisted surface of the welding part may face the narrow wall at the predetermined inclination angle.

The electrode connecting part may further include an auxiliary welding part in the integrating part, the auxiliary welding part being bent parallel to the welding part and the auxiliary welding part being welded to the uncoated region.

The welding part may include a first notch that is substantially aligned with a bottom facing side of the integrating part.

The integrating part may include a second notch extending in a direction parallel to an extending direction of the welding part.

The welding part may include a pair of welding parts. Each welding part of the pair of welding parts may face a respective wide wall of the pair of wide walls at a respective side of the integrating part. The first notch may be located at each welding part of the pair of welding parts.

The second notch may have a symmetrical structure between the pair of welding parts.

The electrode assembly may include a pair of electrode assemblies, providing a pair of uncoated regions. The pair of uncoated regions of the electrode assembly may be welded to an outside surface of the pair of welding parts.

The welding part may include a first welding part that is welded to a part of the uncoated region that is parallel to the wide wall, a second welding part that is in a twisted state with respect to the first welding part and is welded to another part of the uncoated region, and a third welding part that extends in the twisted state from the second welding part and is welded to the other part of the uncoated region.

The electrode assembly may include a pair of electrode assemblies, providing a pair of uncoated regions. The welding part may include a pair of welding parts providing a pair of first welding parts, a pair of second welding parts, and a pair of third welding parts. The pair of uncoated regions of the electrode assembly may be welded to a outside surface of a pair of third welding parts and may face the narrow wall at the predetermined inclination angle.

The pair of uncoated regions of the electrode assembly may be welded to an outside surface of the pair of first welding parts and may be parallel to the wide wall.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
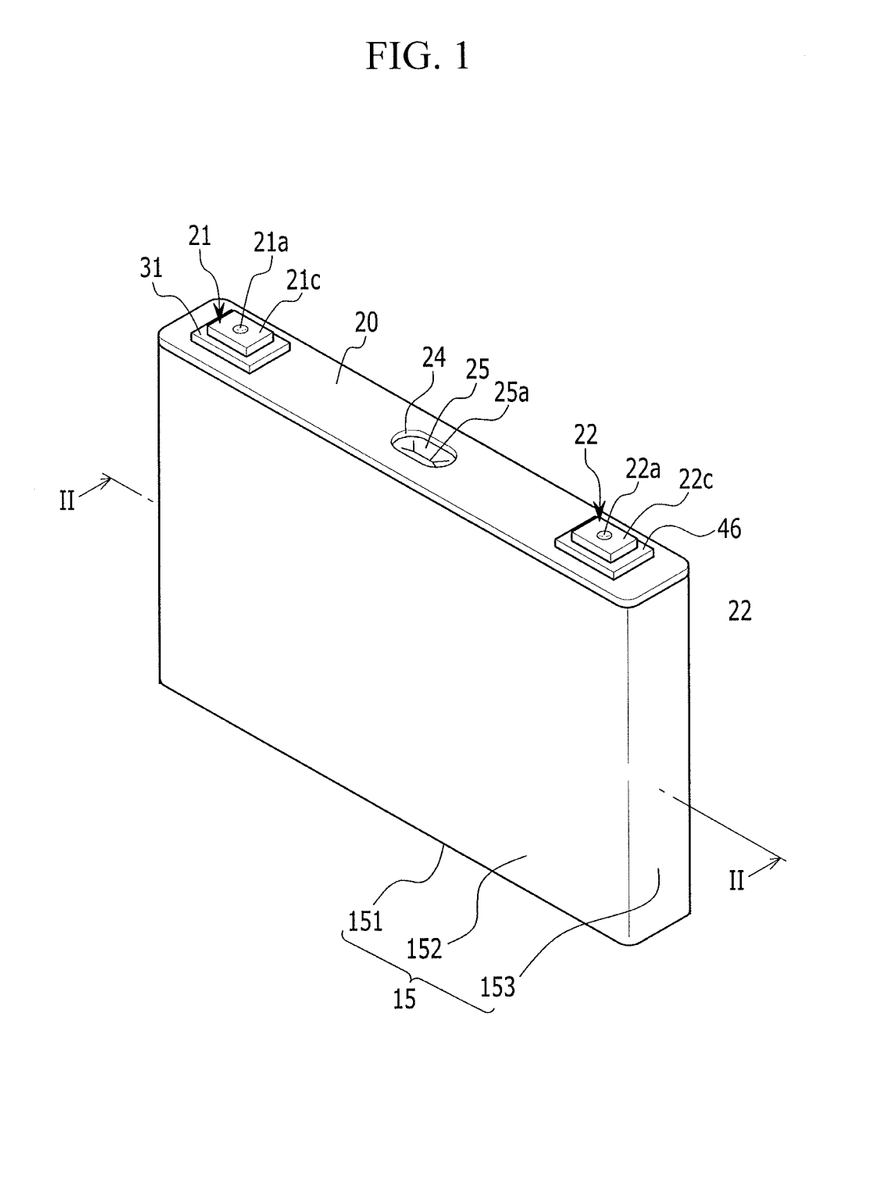
FIG. 1 illustrates a perspective view of a rechargeable battery according to an exemplary embodiment.
Figure 2:
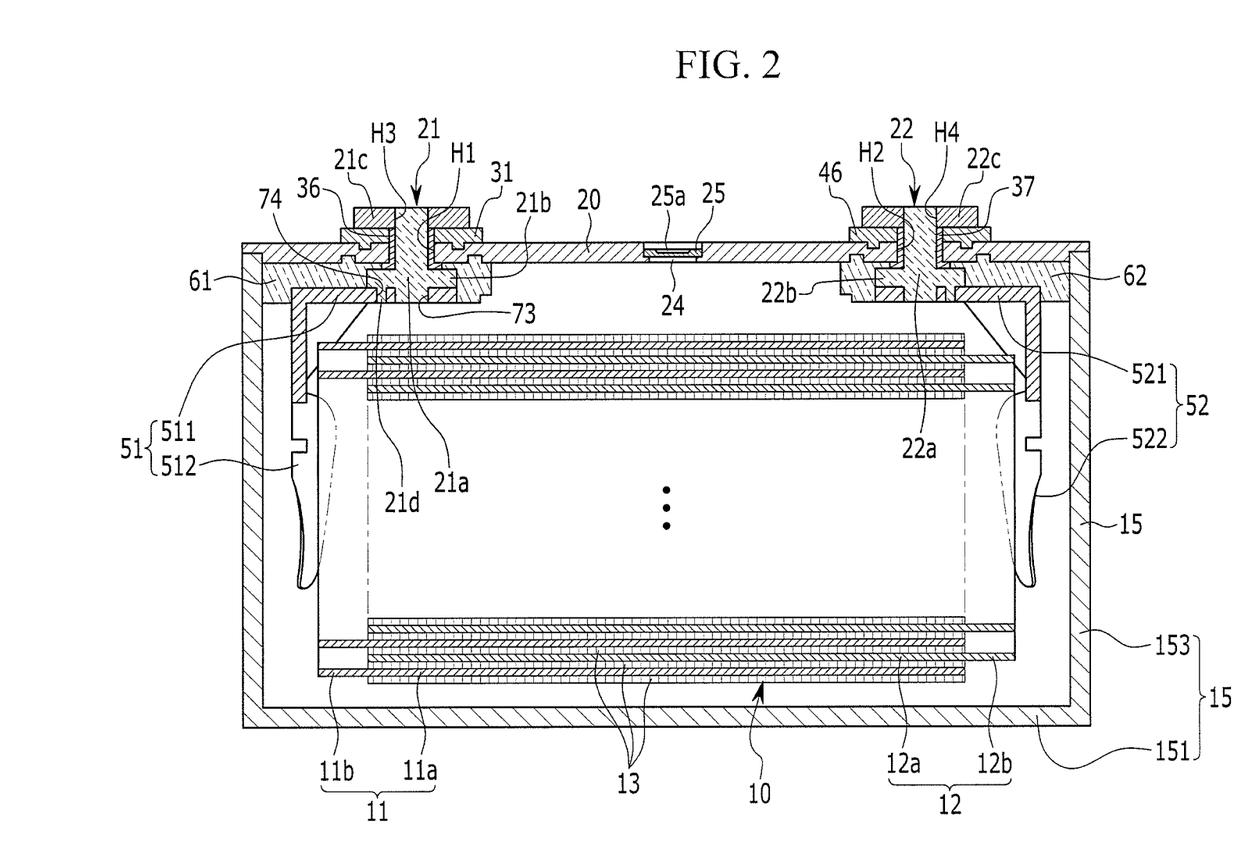
FIG. 2 illustrates a cross-sectional view taken along line II-II in FIG. 1.

FIG. 1 illustrates a perspective view of a rechargeable battery according to an exemplary embodiment, and FIG. 2 illustrates a cross-sectional view taken along line II-II in FIG. 1. Referring to FIGS. 1 and 2, the rechargeable battery according to an exemplary embodiment may include an electrode assembly 10 that charges and discharges current, a case 15 having the electrode assembly 10 and electrolyte solution enclosed therein, a cap plate 20 that is coupled with an opening of the case 15, electrode terminals (for example, a negative terminal 21 and a positive terminal 22) that are disposed on the cap plate 20, and current collecting members 51 and 52 connecting the negative and positive terminals 21 and 22 to the electrode assembly 10.

For example, the electrode assembly 10 may be formed by placing the electrodes (for example, the negative electrode 11 and the positive electrode 12) on respective sides of a separator 13, which is an insulator, and winding the negative electrode 11, the separator 13, and the positive electrode 12 in a jelly roll state, for example, in a spirally-wound state.

The negative electrode 11 and positive electrodes 12 may each include coating regions 11a and 12a formed by applying an active material to a current collector of a metal foil (for example, Cu-foil or Al-foil) and uncoated regions 11b and 12b formed as an exposed current collector by not applying the active material thereto.

The uncoated region 11b of the negative electrode 11 may be formed at one end of the negative electrode 11 along the spirally-wound negative electrode 11. The uncoated region 12b of the positive electrode 12 may be formed at one end of the positive electrode 12 along the spirally-wound positive electrode 12. The uncoated regions 11b and 12b may be disposed at respective ends of the electrode assembly 10.

The case 15 may have an approximately cuboid shape so as to provide a space for receiving the electrode assembly 10 therein. The opening of the case 15 may be formed at one side of the cuboid to allow the electrode assembly 10 to be inserted into an internal space from the outside.

The case 15 may include a quadrangle-shaped bottom 151, a pair of wide walls 152 facing each other between the bottom 151 and the opening and, a pair of narrow walls 153 facing each other and connecting the pair of wide wall 152. The quadrangle-shaped bottom 151 may have rounded corners.

The cap plate 20 may be disposed at the opening of the case 15 to close and seal the opening of the case 15. The case 15 and the cap plate 20 may be made of an aluminum material and may be welded to each other after the electrode assembly 10 has been inserted into the case 15.

The cap plate 20 may have at least one opening. For example, the cap plate 20 may include terminal holes H1 and H2 and a vent hole 24. The negative and positive terminals 21 and 22 may be respectively disposed in the terminal holes H1 and 142 of the cap plate 20, and may be electrically connected to the electrode assembly 10.

The negative and positive terminals 21 and 22 may be electrically connected to the negative and positive electrodes 11 and 12, respectively, of the electrode assembly 10, through the current collecting members 51 and 52. Electrical power generated by the electrode assembly 10 may be drawn out to the outside of the case 15 through the negative and positive terminals 21 and 22.

The negative and positive terminals 21 and 22 may include plate terminals 21c and 22c disposed at an outer side of the cap plate 20 corresponding to the terminal holes H1 and H2, and rivet terminals 21a and 22a that are electrically connected to the current collecting members 51 and 52 and penetrating through the terminal holes H1 and H2 to riveted to the plate terminals 21c and 22c.

The plate terminals 21c and 22c may have through-holes H3 and H4. The rivet terminals 21a and 22a may penetrate through the through-holes H3 and H4 in an upward direction after penetrating through the terminal holes H1 and H2. The negative and positive terminals 21 and 22 may further include flanges 21b and 22b integrally and widely formed with the rivet terminals 21a and 22a at an inner side of the cap plate 20.

At the negative terminal 21, an outside insulation member 31 interposed between the plate terminal 21c and the cap plate 20 may electrically insulate the plate terminal 21c and the cap plate 20. The cap plate 20 may be maintained in a state in which the cap plate 20 is insulated from the negative terminal 21 and the current collecting member 51 of the negative electrode 11 of the electrode assembly 10.

The outside insulation member 31 and the plate terminal 21c may be coupled with the upper end of the rivet terminal 21a to rivet or weld the upper end, such that the outside insulation member 31 and the plate terminal 21c may be fastened to the upper end of the rivet terminal 21a. The plate terminal 21c may be installed at the outside of the cap plate 20 with the outside insulation member 31 interposed therebetween.

At the positive terminal 22, a conductive top plate 46 interposed between the plate terminal 22c and the cap plate 20 may electrically connect the plate terminal 22c and the cap plate 20. The cap plate 20 may be maintained in a state in which the cap plate 20 is electrically connected to the positive terminal 22 and the current collecting member 52 of the positive electrode 12 of the electrode assembly 10.

The top plate 46 and the plate terminal 22c may be coupled with the upper end of the rivet terminal 22a to rivet or weld the upper end, such that the top plate 46 and the plate terminal 22c may be fastened to the upper end of the rivet terminal 22a. The plate terminal 22c may be installed at the outside of the cap plate 20 with the top plate 46 interposed therebetween.

Gaskets 36 and 37 may be installed between the rivet terminals 21a and 22a of the negative and positive terminals 21 and 22 and the insides of the terminal holes H1 and H2 of the cap plate 20. The gaskets 36 and 37 may seal and electrically insulate a space between the rivet terminals 21a and 22a and the cap plate 20.

The gaskets 36 and 37 may also extend between the flanges 21b and 22b and the inside of the cap plate 20, to further seal and electrically insulate a space between the flanges 21b and 22b and the cap plate 20. The gaskets 36 and 37 may prevent the electrolyte solution from leaking through the terminal holes H1 and 142 by securing the negative and positive terminals 21 and 22 in the cap plate 20.

The current collecting members 51 and 52 may electrically connect the negative and positive terminals 21 and 22 to the negative and positive electrodes 11 and 12 of the electrode assembly 10. For example, the current collecting members 51 and 52 may include terminal connecting parts 511 and 521 connected to the negative and positive terminals 21 and 22 and electrode connecting parts 512 and 522 connected to the uncoated regions 11b and 12b of the electrode assembly 10.

The terminal connecting parts 511 and 521 may be coupled with lower ends of the rivet terminals 21a and 22a to caulk the lower ends. The terminal connecting parts 511 and 521 may be connected to the lower ends of the rivet terminals 21a and 22a while being supported by the flanges 21b and 22b.

Insulation members 61 and 62 may be installed between the terminal connecting parts 511 and 521 of the current collecting member 51 and 52 and the cap plate 20, respectively. The insulation members 61 and 62 may electrically insulate the terminal connecting parts 511 and 521 and the cap plate 20 from each other. The insulation members 61 and 62 may have one side coupled with the cap plate 20 and the other side covering the terminal connecting parts 511 and 521, the rivet terminals 21a and 22a, and the flanges 21b and 22b, such that the connection structure therebetween may be stabilized.

The vent hole 24 may be sealed by the vent plate 25. The vent hole 24 may be configured to discharge an internal gas and internal pressure generated due to the charging and discharging of the rechargeable battery. When the internal pressure of the rechargeable battery reaches a predetermined pressure, the vent plate 25 may be cut to open the vent hole 24. The vent plate 25 may have a notch 25a inducing the cut.

Figure 3:
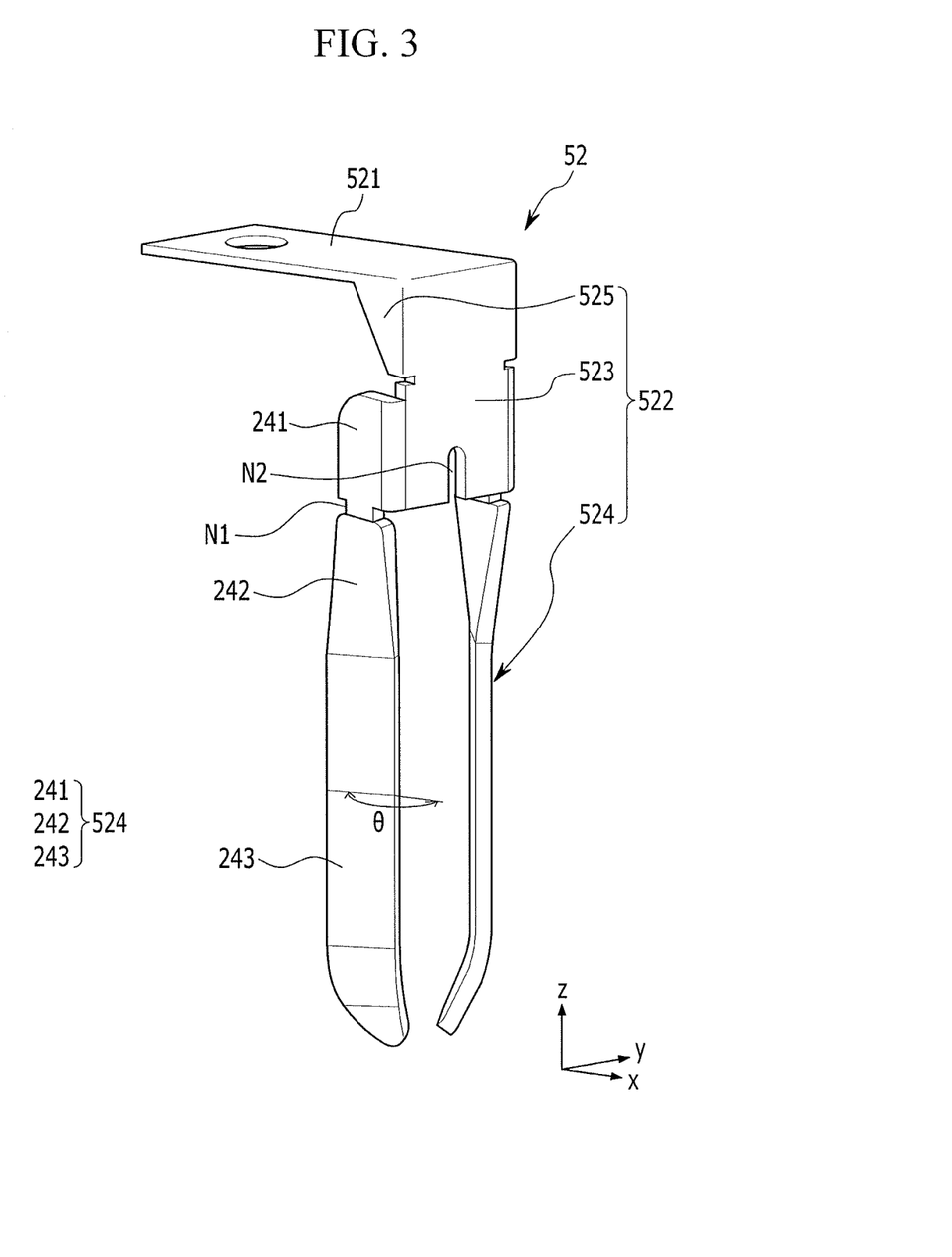
FIG. 3 illustrates a perspective view of a current collecting member of FIG. 2.
Figure 4:
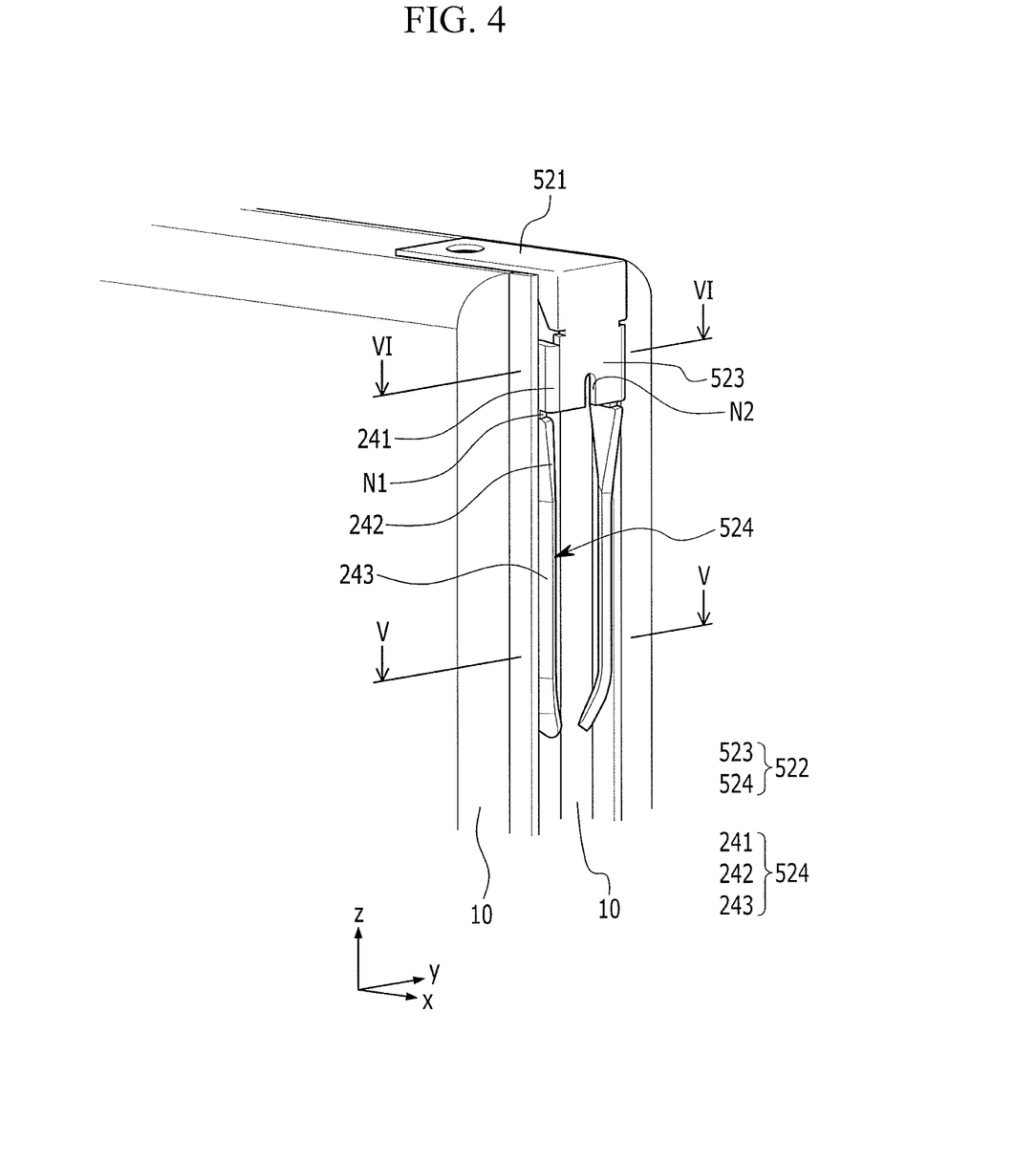
FIG. 4 illustrates a perspective view showing a state in which an electrode connecting part of a current collecting member is welded to an uncoated region of an electrode assembly.
Figure 5:
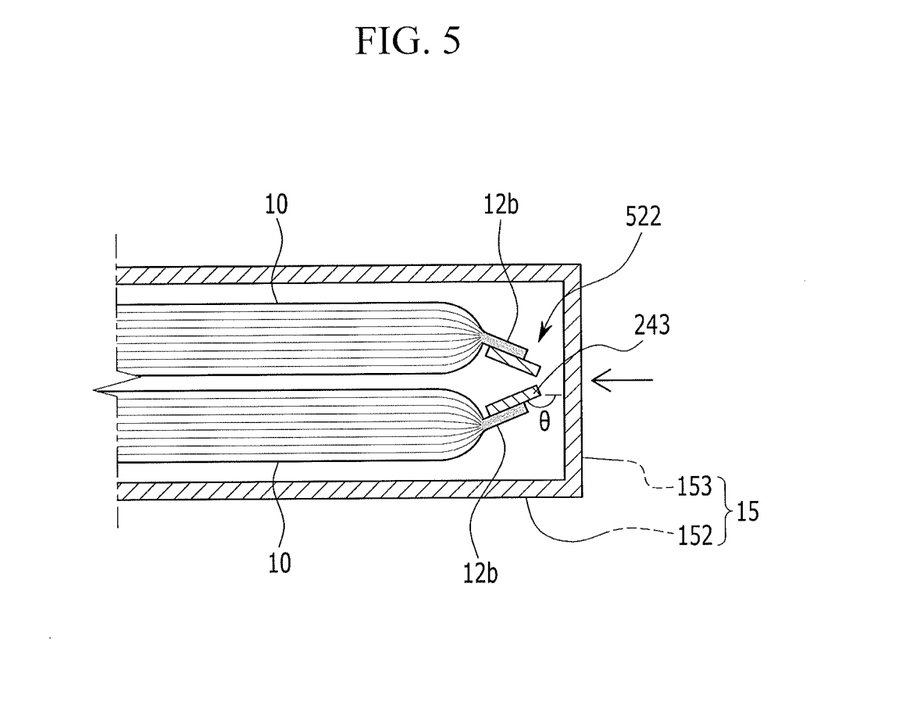
FIG. 5 illustrates a cross-sectional view taken along line V-V in FIG. 4.

FIG. 3 illustrates a perspective view of the current collecting member 52 of FIG. 2, FIG. 4 illustrates a perspective view showing a state in which an electrode connecting part of a current collecting member 52 is welded to an uncoated region of an electrode assembly, and FIG. 5 illustrates a cross-sectional view taken along line V-V in FIG. 4.

For convenience, in the exemplary embodiments of FIG. 3, FIG. 4, and FIG. 5, a current collecting member 52 connected to a positive electrode 12 will be described by way of example. It is to be understood that a similar description may also apply to the current collecting member 51 connected to the negative electrode 11.

Referring to FIG. 3, FIG. 4, and FIG. 5, the current collecting member 52 may be formed by twisting a part of an electrode connecting part 522 to provide a twisted surface. The twisted surface of the electrode connecting part 522 may face towards the end of the uncoated region 12b at a predetermined inclination angle θ with respect to a side wall (a narrow wall 153) of the case 15. A part of the uncoated region 12b may face the narrow wall 153 at the inclined angle θ as the twisted surfaces of the electrode connecting part 522 and the end of the uncoated region 12b faces the narrow wall 153. Herein, the term "inclined angle θ" refers to an angle other than perpendicular to the narrow wall 153 of the case. For example, the twisted surfaces of the electrode connecting part 522 may face towards the end of the uncoated region 12b at a predetermined inclination angle θ with respect an intrusion direction of the narrow wall 153 (an intrusion in an x axis direction in the event that case 15 of the rechargeable battery is impacted at the narrow wall 153).

The electrode connecting part 522 may include an integrating part 523 and a welding part 524. The integrating part 523 may be bent toward a bottom 151 of the case 15 from the terminal connecting part 521 to face the narrow wall 153. The welding part 524 may extend from the integrating part 523 and may be bent toward a wide wall 152 of the case 15, such that a portion at which the welding part 524 and the integrating part 523 are connected to each other faces the wide wall 152. Further, the welding part 524 may extend downwardly toward the bottom 151 of the case from the integrating part 523 to be welded to the uncoated region 12b.

The electrode connecting part 522 may further include an auxiliary welding part 525. The auxiliary welding part 525 may be bent to be parallel to the part of the welding part 524 extending from the integrating part 523. The auxiliary welding part 525 may be welded to the uncoated region 12b. The auxiliary welding part 525 may be connected to the uncoated region 12b at a side adjacent to the terminal connecting part 521. A conductive area between the uncoated region 12b and the electrode connecting part 522 may be increased.

The welding part 524 may be partially twisted to form the twisted surface with respect to the narrow wall 153. The twisted surface of the welding part 524 may face the narrow wall 153 at the predetermined inclination angle θ. The surface of the welding part 524 may be partially twisted in a y axis direction to simultaneously point at an angle between the x and y axes. When the welding part 524 and the uncoated region 12b are welded, the welding part 524 and the uncoated region 12b that are welded to each other may face to the narrow wall 153 at the inclined angle θ.

The welding part 524 may include a first notch N1. The first notch N1 may be formed at a portion that corresponds to a boundary between a portion of the welding part 524 directly extending from one side of the integrating part 523 and a portion of the welding part 524 that does not extend directly from the side of the integrating part 523. For example, as illustrated in FIG. 3 and discussed in more detail below, the notch N1 may be between a first welding part 241 that extends from the side of the integrating part and is parallel to a wide wall 152 and a second welding part 242 that extends downwardly from the first welding part 241. The first notch N1 may be substantially aligned with a bottom facing side of the integrating part 523. If the narrow wall 153 of the case 15 intrudes in the x axis direction due to an impact and an external force, when torsional torque is applied to the welding part 524, the first notch N1 may absorb the torsional torque transferred to the welding part 524 between the integrating part 523 and the welding part 524. The first notch N1 may form a flexible connection structure between the integrating part 523 and the welding part 524 to absorb the torsional torque of the welding part 524.

The welding part 524 may include a pair of welding parts 524 formed toward a pair of the wide walls 152 at both sides of the integrating part 523. The first notch N1 may be formed at each welding part 524 of the pair of welding parts 524. Therefore, the pair of first notches N1 may absorb the torsional torque transferred to the pair of welding parts 524, respectively, and may connect the pair of welding parts 524 to the integrating part 523 in the flexible structure so as to absorb the torsional torque.

The integrating part 523 may include a second notch N2 formed as an elongated slot in a direction parallel with the welding part 524. The second notch N2 may be formed in a symmetrical structure between the pair of welding parts 524.

If the narrow wall 153 of the case 15 intrudes in the x axis direction due to an impact and an external force, when torsional torque is applied to the welding part 524, the second notch N2 may absorb the torsional torque that could be transferred to the pair of welding parts 524 from the integrating part 523. In response to the torsional torque from each of the pair of welding parts 524, the second notch N2 with the symmetrical structure may flexibly connect the pair of welding parts 524.

The electrode assembly 10 may include a pair of electrode assemblies 10 providing a pair of uncoated regions 12b. In the case of in which the electrode assembly 10 is a pair of electrode assemblies 10, the electrode connecting part 522 including the first and second notches N1 and N2 may be effectively applied. The pair of uncoated regions 12b of the electrode assembly 10 may be welded to the outside surface of the pair of the welding parts 524.

Although not shown, in the case in which the electrode assembly 10 includes three or four electrode assemblies 10, the second notch N2 may include two or three second notches N2. That is, the number of second notches N2 may be one less than the number of the electrode assemblies 10.

The welding part 524 may include a first welding part 241, a second welding part 242, and a third welding part 243 that may be divided according to a welding position and state with respect to the uncoated region 12b.

The first welding part 241 may be welded to a part of the uncoated region 12b that is parallel to the wide wall 152 of the case 15. The second welding part 242 may be torsionally connected to the first welding part 241 and may be welded to an other part of the uncoated region 12b. The third welding part 243 may extend in torsional or twisted state from the second welding part 242 and may be welded to the other part of the uncoated region 12b.

In the welding part 524, the first welding part 241 and the uncoated region 12b may be welded in the state parallel to the wide wall 152, the second welding part 242 and the uncoated region 12b may be welded in a gradually twisted state, and the third welding part 243 and the uncoated region 12b may be welded in the state facing at the inclined angle θ with respect to the narrow wall 153. The second welding part 242 and the portion of the uncoated region 12b welded to the second welding part 242 may twist from being parallel to the wide wall 152 adjacent to the first welding part to being at the inclined angle θ adjacent to the third welding part 243.

When the electrode assembly 10 is a pair of electrode assemblies 10 including a pair of uncoated regions 12b, the pair of uncoated regions 12b may be welded to the outside surface of the pair of third welding parts 243, and may face at the inclined angle θ together with the third welding part 243 with respect to the narrow wall 153 (see FIG. 5).

When uncoated region 12b and the welding part 524 are welded to each other, a portion adjacent to the cap plate 20 in a z axis direction may face toward the wide wall 152 of the case 15. The welded portion may twist is in a direction to face more toward the narrow wall 153 from the wide wall 152 according to a downward distance from the cap plate 20 in the z axis direction, until the welded portion faces the narrow wall 153 at the inclined angle θ according to a further distance from the cap plate 20 in the z axis direction.

The pair of uncoated regions 12b and the pair of third welding parts 243 may face the narrow wall 152 at the inclined angle θ, and may be disposed to be symmetric with each other. Thereby, it may be possible to effectively absorb external force due to an intrusion from the narrow wall 152 in the x axis direction.

Figure 6:
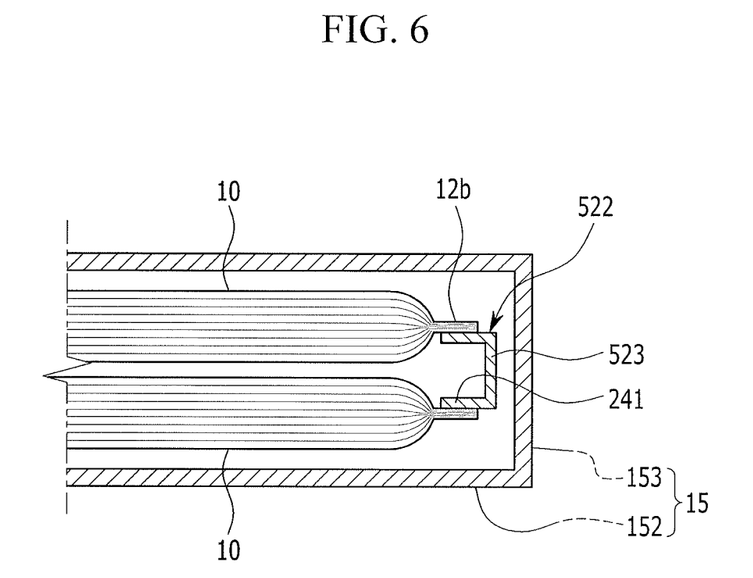
FIG. 6 illustrates a cross-sectional view taken along line VI-VI in FIG. 4.

FIG. 6 illustrates a cross-sectional view taken along line VI-VI in FIG. 4. Referring to FIG. 6, the pair of uncoated regions 12b of the electrode assembly 10 may be welded to the outside surface of the pair of first welding parts 241 and may be parallel with the wide wall.

In the welding part 524 of the electrode connecting part 522, the second welding part 242 may be twisted, the third welding part 243 may extend in the twisted state from the second welding part to face to the narrow wall 153 of the case 15 at the inclined angle θ, such that the welding part 524 is welded to the uncoated region 12b at the inclined angle θ.

In the case in which the narrow wall 153 intrudes into the case 15 due to an impact and the external force applied to the narrow wall 153 in the x axis direction, the outside surface of the uncoated region 12b welded to the third welding part 243 faces the narrow wall 153 at the inclined angle to absorb the impact and the external force applied to the outside surface of the uncoated region 12b through the inclined surface.

The uncoated region 12b and the third welding part 243, which are welded to each other, may further absorb the impact and the external force through the torsional elasticity of the inclined surface. The impact and the external force applied to the narrow wall 153 in the x axis direction may be effectively absorbed by the flexible structure of the first and second notches N1 and N2 and the second and third welding parts 242 and 243. The safety of the rechargeable battery may be improved against the intrusion of the narrow wall 153 in the x axis direction.

By way of summation and review, a current collecting member may include a terminal connecting part coupled with the electrode terminal and an electrode connecting part connected to an electrode assembly. The electrode connecting part may be connected to an uncoated region of the electrode assembly by welding. A plane of the electrode connecting part may be welded onto a plane of the uncoated region.

When the electrode assembly is inserted into the case, a current collecting member may be disposed at each side of the case. Further, the plane of the electrode connecting part and the plane of the uncoated region may be disposed in parallel with each other toward a wide wall of the case of which may formed in an approximately cuboid shape. An end of the electrode connecting part and an end of the uncoated region may be disposed vertically toward or perpendicular to a narrow wall of the case.

When an external force is applied to the narrow wall of the case opposite to the end of the uncoated region and the end of the electrode connecting part welded to each other, the narrow wall may intrude into the case. In this situation, the electrode connecting part and the uncoated region welded to each other may be unable to absorb the external force, and may intrude into the electrode assembly while being pushed into the case by the narrow wall.

Embodiments provide a rechargeable battery that may absorb an impact and an external force applied to a narrow wall of a case by connecting an electrode connecting member of a current collecting member to an uncoated region of an electrode assembly. According to an embodiment, the electrode connecting part of the current collecting member is twisted, the uncoated region of the electrode assembly is connected to the twisted surfaces, such that the twisted surfaces face at a predetermined inclination angle against an invasion or intrusion direction of the one side wall (for example, the narrow wall) of the case, thereby making it possible to absorb the impact and the external force applied to the narrow wall of the case through torsional elasticity.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A rechargeable battery, comprising:
   an electrode assembly that performs charging and discharging operations;
   a case having the electrode assembly enclosed therein, the case including an opening at one end, a bottom facing the opening, the bottom having a quadrangular shape and rounded corners, a pair of wide walls between the bottom and the opening, the pair of wide walls facing each other, and a pair of narrow walls facing each other and connecting the pair of wide walls, wherein, an end of an uncoated region of the electrode assembly faces towards a narrow wall of the pair of narrow walls;
   a cap plate coupled with the opening of the case;
   an electrode terminal on the cap plate; and
   a current collecting member connecting the electrode assembly to the electrode terminal,
   wherein the current collecting member includes:
      a terminal connecting part connected to the electrode terminal, and
      an electrode connecting part connected to the uncoated region of the electrode assembly, the electrode connecting part including:
         an integrating part that is bent toward the bottom of the case from the terminal connecting part to face the narrow wall, and
         a welding part that is welded to the uncoated region, the welding part including:
         a first welding part extending from a lateral side of the integrating part and welded to a first part of the uncoated region of the electrode assembly, the first welding part facing a wide wall of the battery case,
         a second welding part extending from the first welding part toward the bottom of the case and welded to a second part of the uncoated region of the electrode assembly, the second welding part being progressively twisted according to a direction toward the bottom of the case from being perpendicular to the narrow wall to being at a predetermined non-perpendicular inclination angle to the narrow wall, and
         a third welding part extending from the second welding part toward the bottom of the case and welded to a third part of the uncoated region of the electrode assembly, the third welding part being at the predetermined non-perpendicular inclination angle to the narrow wall.

2. The rechargeable battery as claimed in claim 1, wherein the electrode connecting part further includes an auxiliary welding part parallel to the wide walls of the battery case between and joining the terminal connecting part and the integrating part of the electrode connecting part, the auxiliary welding part being welded to a fourth portion of the uncoated region.

3. The rechargeable battery as claimed in claim 1, wherein the welding part includes a first notch between the first welding part and the second welding part, the first notch being substantially aligned with a bottom facing side of the integrating part.

4. The rechargeable battery as claimed in claim 3, wherein the integrating part includes a second notch formed in a direction parallel to an extending direction of the welding part.

5. The rechargeable battery as claimed in claim 4, wherein:
   the welding part includes a pair of welding parts, each welding part of the pair of welding parts facing a respective wide wall of the pair of wide walls at a respective side of the integrating part, and
   the first notch is located at each of the pair of welding parts.

6. The rechargeable battery as claimed in claim 5, wherein the second notch is a symmetrical structure between the pair of welding parts.

7. The rechargeable battery as claimed in claim 6, wherein:
   the electrode assembly includes a pair of side-by-side electrode assemblies, providing a pair of side-by-side uncoated regions, and
   the pair of uncoated regions of the electrode assembly is welded to an outside surface of the pair of welding parts.

8. The rechargeable battery as claimed in claim 1, wherein:
   the electrode assembly includes a pair of electrode assemblies side-by-side in the case, providing a pair of side-by-side uncoated regions,
   the welding part includes a pair of welding parts providing a pair of first welding parts, a pair of second welding parts, and a pair of third welding parts;
   the pair of uncoated regions of the electrode assembly is welded to a outside surface of the pair of third welding parts and faces the narrow wall at the predetermined non-perpendicular inclination angle.

9. The rechargeable battery as claimed in claim 8, wherein the pair of uncoated regions of the electrode assembly is welded to an outside surface of the pair of first welding parts and is parallel to the wide wall.

* * * * *